US006310735B1

(12) United States Patent
Best et al.

(10) Patent No.: US 6,310,735 B1
(45) Date of Patent: Oct. 30, 2001

(54) RELEASABLE AND STRESS-FREE SECURING ASSEMBLY FOR OPTICAL ELEMENTS

(75) Inventors: Stefan Uwe Best, Solms-Oberbiel; Rainer Schnabel, Weilmünster, both of (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 09/576,892

(22) Filed: May 24, 2000

(30) Foreign Application Priority Data

May 29, 1999 (DE) .............................................. 199 24 849

(51) Int. Cl.⁷ ...................................................... G02B 7/02
(52) U.S. Cl. ............................................. 359/819; 359/830
(58) Field of Search ..................................... 359/819, 829, 359/830

(56) References Cited

U.S. PATENT DOCUMENTS 5,052,782  10/1991  Myer ..................................... 359/827

FOREIGN PATENT DOCUMENTS

| 1 113 101 | 5/1963 | (DE) . |
| 1 966 392 | 8/1967 | (DE) . |
| 29 22 287 | 12/1980 | (DE) . |
| 200113391-A | * 1/2001 | (JP) .................................. G02B/7/02 |

\* cited by examiner

Primary Examiner—Georgia Epps
Assistant Examiner—Saeed Seyrafi
(74) Attorney, Agent, or Firm—Foley & Lardner

(57) ABSTRACT

A releasable and stress-free securing assembly for an optical element (2, 3) positioned in a centered manner in a mount (1) is provided. The optical element (2, 3) is provided, in the border region which is to be retained, with a beveled surface (6) inclined in the direction of the mount (1). The mount (1) has a groove (4) which is open axially in front of the optical element (2, 3). A ring element (5) which is elastically deformable in the axial direction is pressed in between the beveled surface (6) and groove (4). The angle of inclination of the beveled surface (6) is between 40° and 50°. The boundary (11') of the groove (4) in the region of the optical element (2, 3) is level with a bevel edge (8), which is oriented toward the mount (1), and the boundary (11) of the groove (4) in front of the optical element (2, 3) is undercut at an angle of from 10° to 15°. The depth of the groove (4) is greater than the radius of the ring element (5) by from 0.15 to 0.2 mm, and a free opening between a bevel edge (10), which is located on the optical element (2, 3) toward the center, and the front edge (12) of the undercut boundary (11) of the groove (4) is equal to 0.8 of the diameter of the ring element (5).

5 Claims, 1 Drawing Sheet

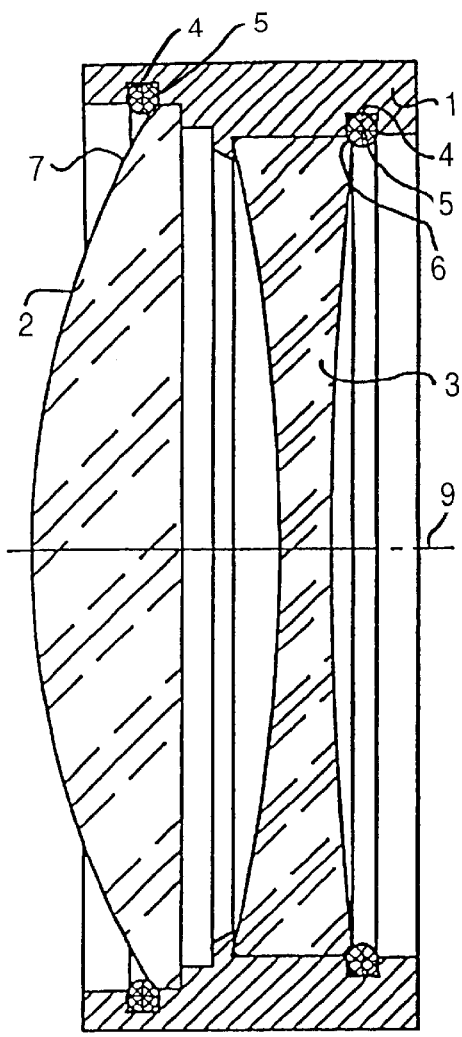
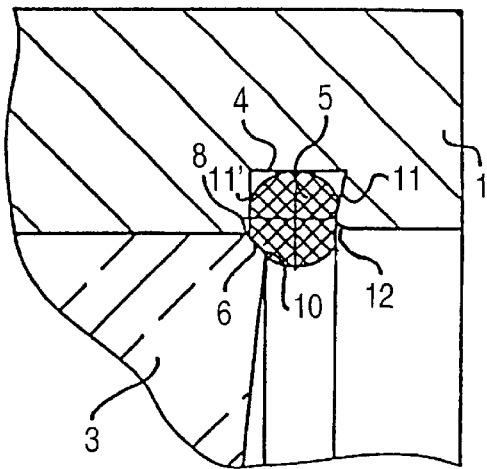
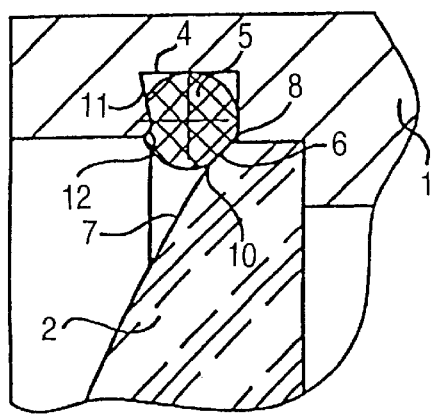
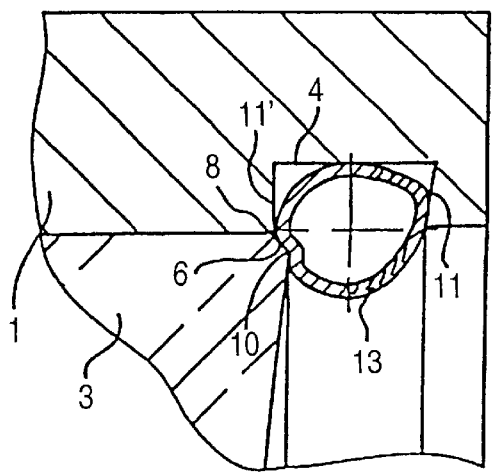
FIG. 1
FIG. 2A
FIG. 2B
FIG. 3

RELEASABLE AND STRESS-FREE SECURING ASSEMBLY FOR OPTICAL ELEMENTS

BACKGROUND

The invention relates to a releasable and stress-free securing assembly for an optical element positioned in a centered manner in a mount. The optical element is provided, in the border region which is to be retained, with a beveled surface inclined in the direction of the mount. The mount has a groove which is open axially in front of the optical element, and a ring element which is elastically deformable in the axial direction is pressed in between the beveled surface and groove.

A securing assembly of this type is known from German Publication DE 29 22 287 A1. A lens positioned in a centered manner in a mount body is retained by an elastic ring, running in the vicinity of the circumference, under elastic prestressing against an axial abutment of the mount body. The ring consists of a rubber-like elastic material and is pressed into a ring groove of the mount body. The ring groove is partially overlapped in the axial direction by the circumferential surface of the lens. The cross section of the ring groove is intended to be at least of the same size as that of the ring, and it is to be possible for the lens to be inserted even if the ring has been placed in position beforehand. Possible shapes specified for the ring groove are rectangular, semicircular and trapezoidal cross sections, that is to say, shapes which enclose the ring in an essentially convex manner.

German Publication DE 1 113 101 PS also discloses such a securing assembly in which the ring groove corresponds precisely to the cross section of the pressed-in ring. On the mount body, it is intended to arrange, above the ring groove, an inwardly oriented, obliquely positioned peripheral surface which may be interrupted in the form of bayonet-like lugs.

Although these securing assemblies have already been known for decades, they have not gained widespread acceptance in practice.

A securing assembly which is comparable as far as outlay for, and processing of, parts are concerned involves the optical element being secured by a snap ring engaging in a groove in the mount. The snap ring usually consists of metal and may be of a circular or rectangular cross section. The depth of the groove and the snap-in depth of the snap ring in the radial direction are coordinated with one another. The height of the lens border and the position of the adjacent groove likewise have to be adapted to one another with great precision in order that the lens fit is neither too loose nor too tight. It is only possible to compensate for tolerances by way of costly follow-up work. It is not possible to compensate for dimensional tolerances produced by temperature fluctuations. Removal of the snap ring without scratching the lens surface is only possible if extreme care is taken. However, in particular in the case of optical systems made up of a number of elements, subsequent removal is necessary if particles of dirt are found in the system following assembly.

It is known, from German Utility Model 1 966 392, to provide above the lens, positioned in a centered manner, in the mount body a conically shaped groove into which there is inserted a plastic snap ring which has a correspondingly shaped conical facet. The conical abutment surface produces a contact-pressure force which acts in the axial direction, counteracts loosening of the snap ring and compensates for production tolerances in the groove. Since the snap ring consists of plastic, the risk of the lens surface being scratched is avoided.

It is also the case that this type of securing assembly has not been able to gain widespread acceptance.

SUMMARY OF THE INVENTION

An object of the invention was for the securing assembly known per se to be developed, by optimizing the variables which significantly influence a firm hold for the optical elements, such that they can also be used, in particular, for mounts of high-performance optical systems.

This object is achieved according to the invention, in the case of a securing assembly of the type mentioned in the introduction, in that the angle of inclination of the beveled surface is between 40° and 50°, in that that boundary of the groove which is located in the region of the optical element is level with the bevel edge which is oriented toward the mount, and that boundary of the groove which is located in front of the optical element is undercut at an angle of from 10° to 15°, in that the depth of the groove is greater than the radius of the ring element by 0.15 to 0.2 mm, and the free opening between that bevel edge which is located on the optical element and the front edge of the undercut boundary of the groove is equal to 0.8 of the diameter of the ring element.

For the introduction of the ring element, it is advantageous if the front edge of the undercut boundary of the groove is rounded. The Shore hardness of the ring element should preferably be approximately 70.

The ring element provided may also be a radial annular spring, of which the ring elements can be indented by the bevel edge which is located on the optical element. The annular spring may also be designed such that its spring force, by suitable inclination of the ring elements, acts between the beveled surface and the undercut boundary of the groove.

The basic idea of the invention is to form, merely between the beveled lens border and the groove, a cavity into which the elastically deformable ring element can be pressed. The specified dimensions prevent the situation where the ring element can spring out of the cavity and, on the other hand, also the situation where the ring element cannot be pushed fully out of the retaining position into the cavity beyond the lens border. The deformability in the axial direction allows tolerance compensation between the inner bevel edge and undercut boundary of the groove, as well as compensation for material deformation in the axial direction. The bevel edge which is located on the lens surface indents the pressed-in ring element and, in addition, prevents the ring element from springing out automatically. The undercut of the groove boundary which is located opposite said bevel edge serves for securing the pressed-in ring element further against springing out automatically.

In addition, sealing of the mount can be achieved by using a closed O-ring as the ring element, it being possible, on account of the Shore hardness selected, for the O-ring, on the one hand, to be sufficiently elastic and, on the other hand, still to be punctured, and drawn out, by a needle-like tool. This virtually completely rules out damage to the lens surface.

Annular springs are known and, as far as design and properties are concerned, are described in a catalog GDM3M, sheet 9, from Bal Seal of Amsterdam, Holland. The entire contents of this catalog are incorporated herein by reference. They are available in the form of radial annular springs and as axial annular springs. U.S. Pat. No. 5,052,782 describes the use of an axial annular spring in conjunction with a lock ring for securing lens elements in a stress-free manner. In the case of axial annular springs, the ring elements are inclined in relation to one another, with the result that they may be inclined further, under spring stressing, under the pressure of the lock ring. In the case of the radial annular spring provided according to the invention, the ring elements are indented on the bevel edge which is located on the lens element and, moreover, are locked in the opposite undercut.

BRIEF DESCRIPTION OF THE DRAWINGS

Exemplary embodiments of the securing assembly according to the invention are illustrated schematically in the drawings and described hereinbelow with reference to the figures, in which:

FIG. 1 shows a mount with lenses placed in position, and the securing assembly thereof;

FIGS. 2a and 2b show a detail with a sealing ring; and

FIG. 3 shows a detail with a radial annular spring.

DETAILED DESCRIPTION OF PREFERRED EMBODIMENTS

A lens 2 with a convex surface which is to be retained and a lens 3 with a concave surface which is to be retained are introduced, along a lens center 9, into the mount 1 illustrated in FIG. 1. Provided in the mount 1, in the border region of the lenses 2, 3, are grooves 4 into which elastically deformable ring elements 5 are pressed. A beveled surface 6 is integrally formed on the concave surface of the lens 3 in order to provide a surface which runs in the direction of the mount 1 at an acute angle. The angle of inclination is preferably between 40° and 50° and most preferably 45°, with respect to centerline 9. A specific bevel with a corresponding acute angle is also integrally formed even in the case of convex lenses, despite the existing inclination 7 in the direction of the mount.

FIG. 2a shows a detail of a cross section through the mount 1, concave lens 3, groove 4 and ring element 5, which in this case is formed, for example, by a rubber sealing ring or by an O-ring. The beveled surface 6 is integrally formed on the border of the lens 3. The beveled surface has a bevel edge 8, which is located near the mount, and a bevel edge 10, which is oriented toward the lens center 9 and is located on the lens surface. The boundary 11' of the groove 4 butts against the bevel edge 8. The groove 4 is undercut on the boundary 11, which is located opposite the beveled surface 6. The undercut angle is between 10° and 15°. In this embodiment, the front edge 12 of the boundary 11 is rounded.

The distance between the base of the groove 4 and bevel edge 10 is visibly greater than the cross-sectional radius of the ring element 5, but smaller than the cross-sectional diameter. It is preferably greater than the radius of the ring element 5 by 0.15 mm. The free opening between the bevel edge 10 and the rounded groove edge 12 is likewise smaller than the cross-sectional diameter of the ring element 5. It is intended to be, as far as possible, equal to 0.8 of the diameter of the ring element 5.

As the ring element is pressed into the cavity formed by the beveled surface 6 and groove 4, the ring element 5 deforms elastically, to be precise it is compressed in the axial direction and extended in the radial direction. The majority of the cross-sectional surface area of the ring element 5 is located within the cavity and retains the lens 3 firmly. Slight tolerances between the bevel edge 8 and the position of the groove 4 are compensated for by the elastically deformable ring element 5. It is likewise possible for material changes in the axial direction to be balanced out by the ring element 5. In addition, the ring element 5 constitutes a means for preventing impact and vibration. The elasticity of the material for the ring element 5 may be adapted to the requirements in each case for a firm hold and elastic compensation. It preferably corresponds to a Shore hardness of 70.

FIG. 2b shows the corresponding detail for a convex lens.

In the case of the detail which is illustrated in FIG. 3 and includes a radial annular spring, it can be seen how the ring element 13 illustrated is indented on the bevel edge 10 and deformed in the direction of the undercut groove 4. As a result, the annular spring likewise has the majority of its cross-sectional surface area retained securely in the cavity between the beveled surface 6 and undercut groove 4.

Since the ring elements 13 of the annular spring can be deformed less easily than, for example, an elastomeric sealing ring, careful coordination of the external diameter of the ring elements 13 in relation to the distance of the opening between the bevel edge 10 and front groove edge has to be provided. Inclination of the ring elements 13 during the pressing-in operation makes it possible to compensate for tolerances and to produce a resultant spring force in the direction of the beveled surface 6.

The entire contents of German Application 199 24 849.4, filed May 29, 1999, on which this present application is based, is incorporated herein by reference.

What is claimed is:

1. A securing assembly, comprising:

a mount;

an optical element positioned in a centered manner in the mount, the optical element being provided, in a border region which is to be retained, with a beveled surface inclined in the direction of the mount;

a groove, in the mount, which is open axially in front of the optical element; and a ring element, which is elastically deformable in the axial direction of the mount, pressed in between the beveled surface and groove, wherein an angle of inclination of the beveled surface is between 40° and 50°;

a boundary of the groove in the region of the optical element is level with a bevel edge of the beveled surface which is oriented toward the mount, and a boundary of the groove in front of the optical element is undercut at an angle of from 10° to 15°, the depth of the groove is greater than the radius of the ring element by from 0.15 to 0.2 mm, and a free opening between a bevel edge of the beveled surface which is located toward a centerline of the optical element and a front edge of an undercut boundary of the groove is equal to 0.8 of the diameter of the ring element.

2. The securing assembly as claimed in claim 1, wherein the front edge of the undercut boundary of the groove is rounded.

3. The securing assembly as claimed in claim 1, wherein the Shore hardness of the ring element is approximately 70.

4. The securing assembly as claimed in claim 1, wherein the ring element is a radial annular spring, wherein ring elements can be indented by the bevel edge of the beveled surface which is located toward the centerline of the optical element.

5. The securing assembly as claimed in claim 1, wherein the ring element is a radial annular spring wherein spring force acts between the beveled surface and the undercut boundary of the groove by inclination of ring elements.

* * * * *